US012621730B2

(12) United States Patent
    Chandrashekar et al.

(10) Patent No.: US 12,621,730 B2
(45) Date of Patent: May 5, 2026

(54) TARGET CELL PRIORITIZATION FOR LAYER 1/LAYER 2 TRIGGERED MOBILITY

(71) Applicants: RAKUTEN MOBILE, INC., Tokyo (JP); Rakuten Symphony, Inc., Tokyo (JP)

(72) Inventors: Subramanya Chandrashekar, Indore (IN); Awn Muhammad, Tokyo (JP)

(73) Assignees: RAKUTEN SYMPHONY, INC., Tokyo (JP); RAKUTEN MOBILE, INC., Tokyo (JP)

( * ) Notice: Subject to any disclaimer, the term of this patent is extended or adjusted under 35 U.S.C. 154(b) by 459 days.

(21) Appl. No.: 18/019,621

(22) PCT Filed: Jan. 24, 2023

(86) PCT No.: PCT/US2023/061177
    § 371 (c)(1),
    (2) Date: Feb. 3, 2023

(87) PCT Pub. No.: WO2024/158428
    PCT Pub. Date: Aug. 2, 2024

(65) Prior Publication Data
    US 2024/0251308 A1     Jul. 25, 2024

(51) Int. Cl.
    *H04W 36/00*          (2009.01)
(52) U.S. Cl.
    CPC ............................... *H04W 36/0083* (2013.01)
(58) Field of Classification Search
    CPC ..... H04W 36/0083; H04W 36/008357; H04W 36/0061; H04W 36/087
    See application file for complete search history.

(56) References Cited

U.S. PATENT DOCUMENTS 9,479,973 B2     10/2016  Centonza et al.
11,477,703 B2 *  10/2022  Xu .................... H04W 72/0453
                         (Continued)

FOREIGN PATENT DOCUMENTS

WO    WO-2020144917 A1 *  7/2020  ...... H04W 36/00837
WO    WO-2020162811 A1 *  8/2020  ........ H04W 36/0094
WO    2023/285099 A1      1/2023

OTHER PUBLICATIONS

3GPP TS 38.473, 3rd Generation Partnership Project, Technical Specification Group Radio Access Network, NG-RAN,F1 Application Protocol (F1AP) (Release 17), Sep. 2022.
                         (Continued)

*Primary Examiner* — Qun Shen
(74) *Attorney, Agent, or Firm* — Sughrue Mion, PLLC

(57)                    ABSTRACT

In general, the current subject matter relates to target cell prioritization for layer 1/layer 2 triggered mobility (LTM). In some implementations, target cell prioritization for LTM can include receiving, at a serving distributed unit (DU) of a base station from a centralized unit control plane (CU-CP) of the base station, information indicating a handover priority ranking of a plurality of Layer 1/Layer 2 triggered mobility (LTM) target cells of a second DU of the base station, and selecting, at the serving DU and based on the received information, one of the plurality of LTM target cells for handover of service for a user equipment (UE) from the serving DU, and triggering the handover of the service for the UE from the serving DU to the selected target cell. Each of the plurality of LTM target cells from which the serving DU selects satisfies handover criteria.

16 Claims, 15 Drawing Sheets

(56)     References Cited

U.S. PATENT DOCUMENTS

| | | | |
|---|---|---|---|
| 12,402,046 | B2 * | 8/2025 | Chandrashekar ..... H04W 36/06 |
| 2014/0206361 | A1 * | 7/2014 | Centonza ........ H04W 36/00695 |
| | | | 455/444 |
| 2018/0279182 | A1 * | 9/2018 | Sang ................... H04W 36/087 |
| 2019/0342800 | A1 * | 11/2019 | Sirotkin ................ H04W 36/02 |
| 2022/0046490 | A1 * | 2/2022 | Tripathi ............ H04W 36/0085 |
| 2023/0388871 | A1 * | 11/2023 | Guo .................. H04W 36/0069 |
| 2024/0163749 | A1 * | 5/2024 | Gürsu ................... H04W 16/28 |
| 2024/0244494 | A1 * | 7/2024 | Chandrashekar ............................ H04W 36/0016 |

OTHER PUBLICATIONS

MediaTek Inc., RP-221799 (was RP-221558), "Revised WID on Further NR mobility enhancements," 3GPP TSG RAN Meeting #96, Electronic Meeting, Jun. 6-9, 2022.
International Search Report dated Jun. 27, 2023, issued in International Application No. PCT/US2023/061177.
Written Opinion dated Jun. 27, 2023, issued in International Application No. PCT/US2023/061177.

\* cited by examiner

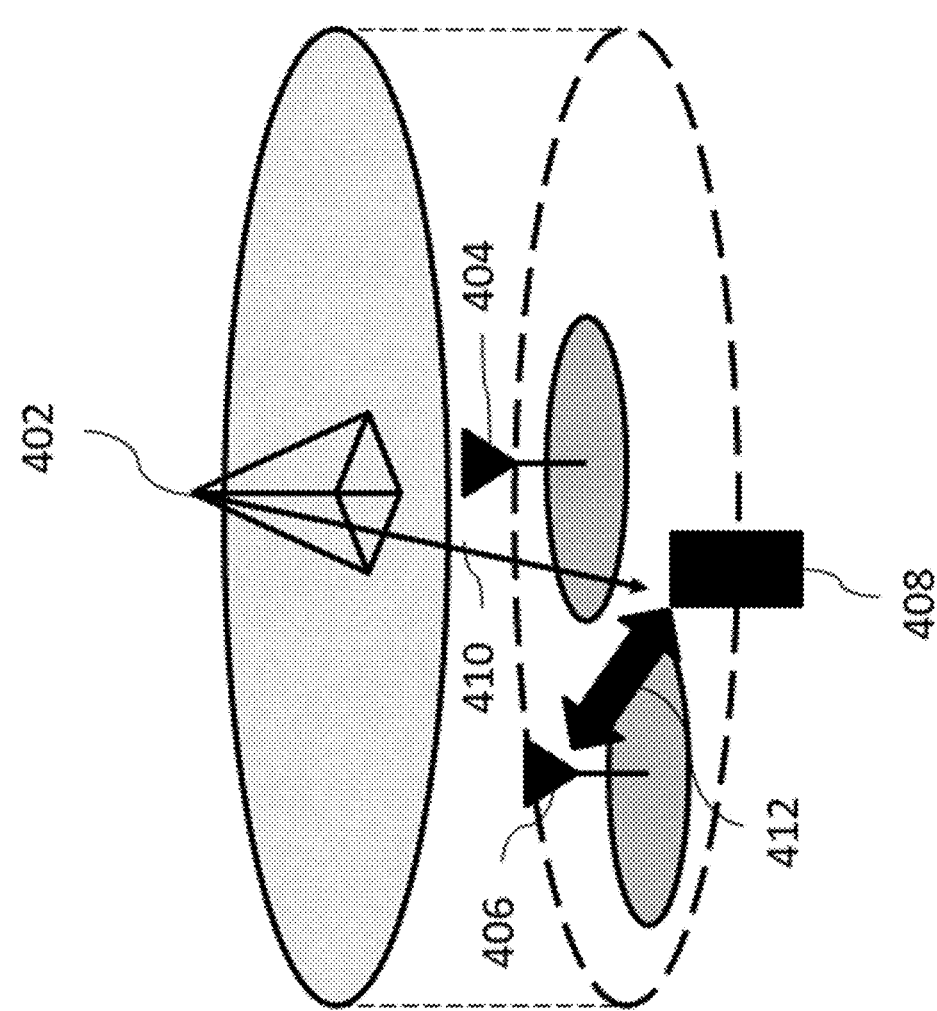
FIG. 4.

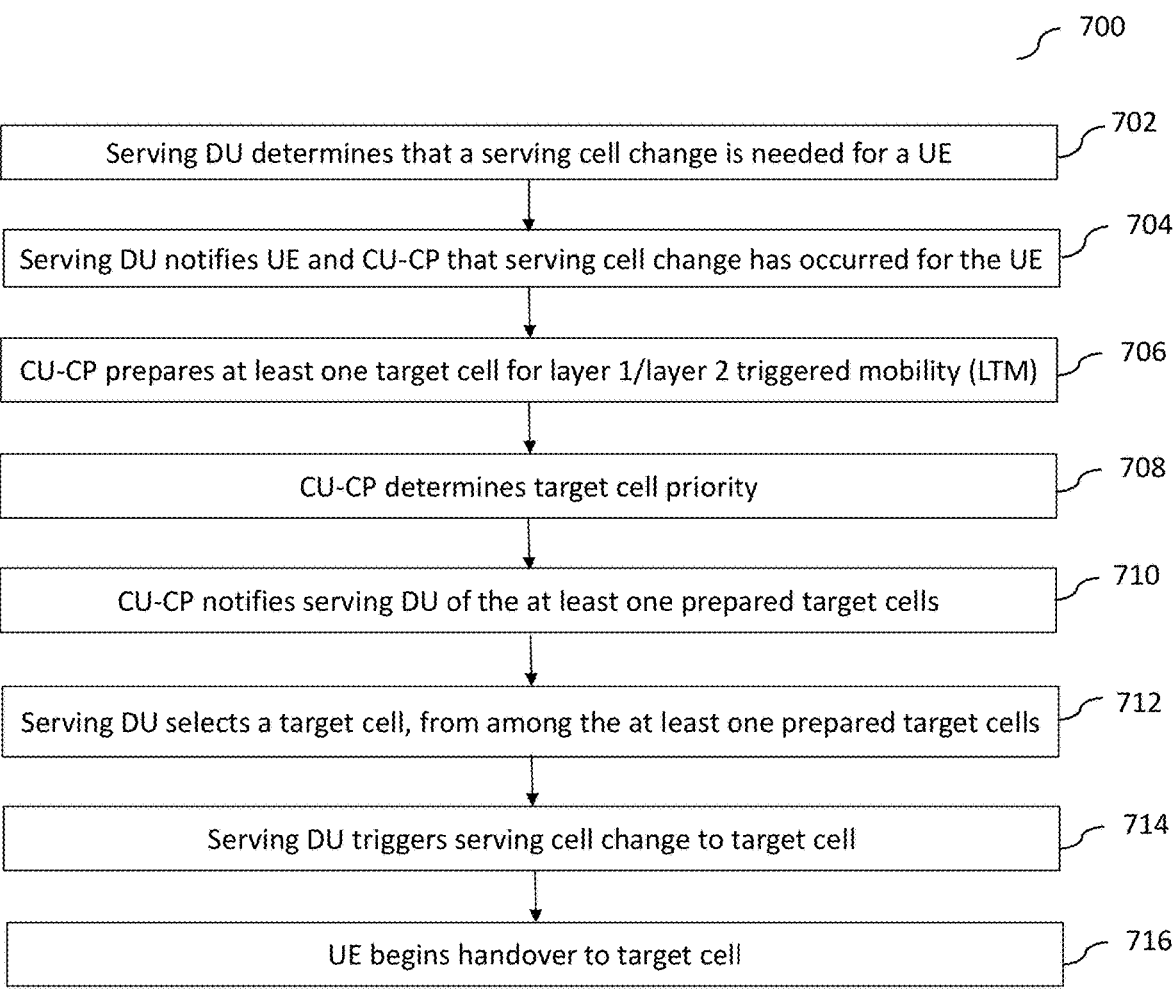

700

Serving DU determines that a serving cell change is needed for a UE — 702

Serving DU notifies UE and CU-CP that serving cell change has occurred for the UE — 704

CU-CP prepares at least one target cell for layer 1/layer 2 triggered mobility (LTM) — 706

CU-CP determines target cell priority — 708

CU-CP notifies serving DU of the at least one prepared target cells — 710

Serving DU selects a target cell, from among the at least one prepared target cells — 712

Serving DU triggers serving cell change to target cell — 714

UE begins handover to target cell — 716

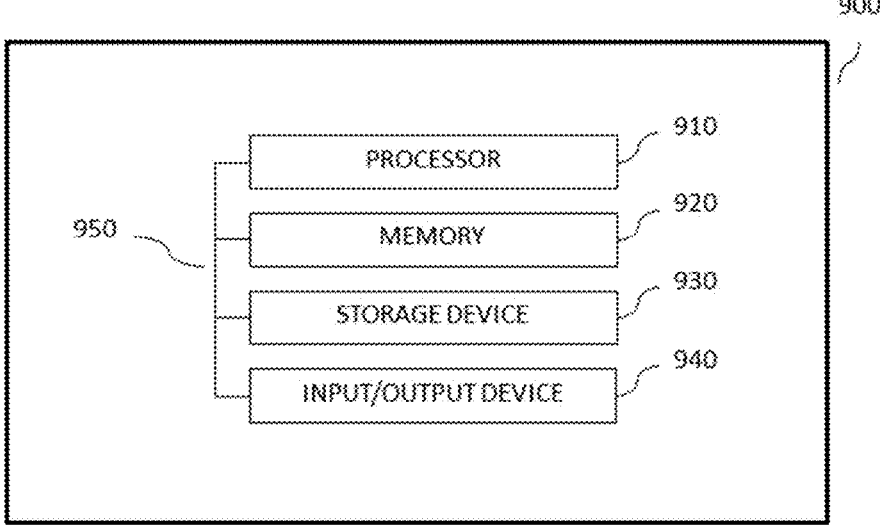

950

PROCESSOR — 910

MEMORY — 920

STORAGE DEVICE — 930

INPUT/OUTPUT DEVICE — 940

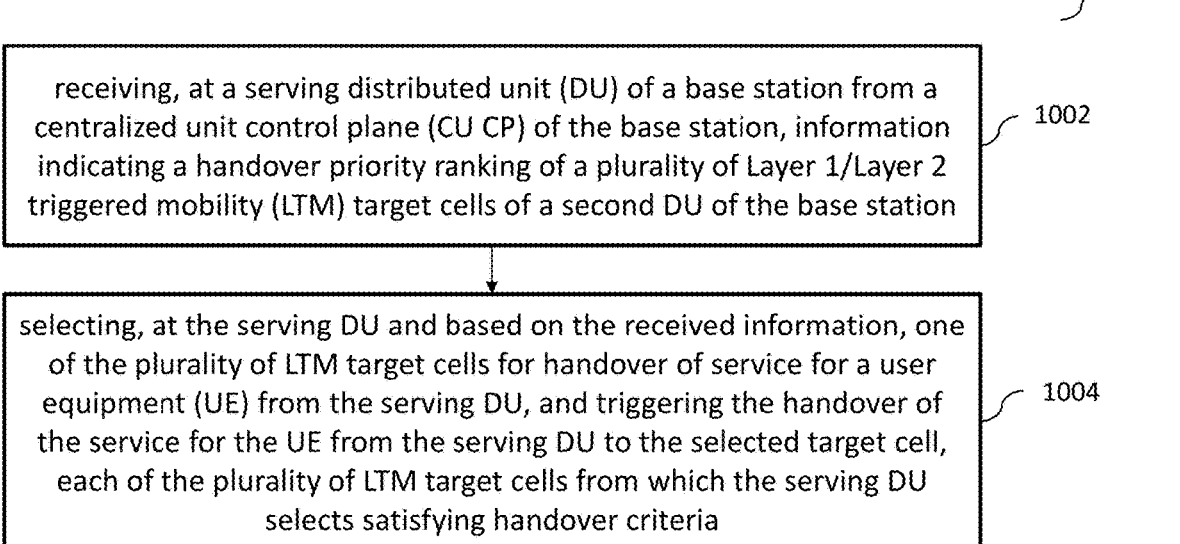

receiving, at a serving distributed unit (DU) of a base station from a centralized unit control plane (CU CP) of the base station, information indicating a handover priority ranking of a plurality of Layer 1/Layer 2 triggered mobility (LTM) target cells of a second DU of the base station — 1002 selecting, at the serving DU and based on the received information, one of the plurality of LTM target cells for handover of service for a user equipment (UE) from the serving DU, and triggering the handover of the service for the UE from the serving DU to the selected target cell, each of the plurality of LTM target cells from which the serving DU selects satisfying handover criteria — 1004

TARGET CELL PRIORITIZATION FOR LAYER 1/LAYER 2 TRIGGERED MOBILITY

CROSS-REFERENCE TO RELATED APPLICATIONS

The present application claims priority to and is the 35 U.S.C. 371 United States National Phase application based on International Patent Application No. PCT/US23/61177, filed on Jan. 24, 2023, entitled "TARGET CELL PRIORI-TIZATION FOR LAYER 1/LAYER 2 TRIGGERED MOBILITY," which is hereby incorporated by reference in its entirety.

TECHNICAL FIELD

In some implementations, the current subject matter relates to telecommunications systems, and in particular, to target cell prioritization for layer 1/layer 2 triggered mobility (LTM).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A base station for a 5G cellular network can include a centralized unit (CU), one or more distributed units (DUs) communicatively coupled to the CU, and one or more radio units (RUs) each communicatively coupled to at least one of the one or more DUs and each configured to be communicatively coupled to one or more mobile phones and/or other user equipments (UEs). The CU can be logically split into a control plane portion CU-CP and one or more user plane portions (CU-UP). During the course of a UE's communicative coupling with the base station, the DU supporting the UE may change, e.g., be handed over, from one DU (a serving DU) to one or more other DUs (target DUs). Multiple target cells at the one or more DUs can be prepared for handover. However, if the configuration of a prepared target cell does not match the source configuration, user experience may be compromised even when the prepared target cell satisfies radio conditions needed for the UE to undergo Serving Cell Change (SSC).

SUMMARY

In some implementations, the current subject matter relates to a computer-implemented method. The method can include receiving, at a serving DU of a base station from a CU-CP of the base station, information indicating a handover priority ranking of a plurality of LTM target cells of a second DU of the base station, and selecting, at the serving DU and based on the received information, one of the plurality of LTM target cells for handover of service for a UE from the serving DU, and triggering the handover of the service for the UE from the serving DU to the selected target cell. Each of the plurality of LTM target cells from which the serving DU selects satisfies handover criteria.

The method may allow for a target cell to be selected for handover that allows for as little interruption in service and/or reduced service quality as possible for the UE, thereby improving user experience.

In some implementations, the current subject matter can include one or more of the following optional features.

In some implementations, the handover priority ranking can be based on a target cell configuration of each of the plurality of LTM target cells. Further, the target cell configuration of each of the plurality of LTM target cells can include at least one of a configuration regarding GBR allocation for GBR DRBs, a configuration regarding PDU session to DRB mapping, a configuration regarding a carrier configuration for carrier aggregation, a configuration regarding slice mapping for UE services, and a configuration regarding the UE's accepted DRBs; and/or the handover priority ranking can be based on the configuration of each of the plurality of LTM target cells compared to a configuration of the serving cell. Further, at least one target DU including the plurality of LTM target cells can provide the target cell configuration for each of the plurality of LTM target cells to the CU-CP in an F1 message, and/or the handover priority ranking can be re-computed whenever an LTM target cell is added, reconfigured, or removed for the UE. Further, the at least one target DU can also provide a list of changes for the plurality of LTM target cells compared to a serving cell configuration.

In some implementations, the handover criteria can include a predetermined threshold radio quality, the operations can further include determining, at the serving DU, which one or more of the plurality of target cells has a radio quality above the predetermined threshold radio quality, and the selection can be among only the one or more determined target cells.

In some implementations, the triggering can include transmitting, from the serving DU to the UE, a MAC CE message.

In some implementations, the base station can have a disaggregated architecture.

In some implementations, the base station can include a Next Generation Radio Access network (NG-RAN) node. Further, the NG-RAN node can include a gNodeB or an ng-eNodeB.

In some implementations, the base station can include at least one processor and at least one non-transitory storage media storing instructions that, when executed by the at least one processor, cause the at least one processor to perform the method.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 4 illustrates an exemplary 3GPP split architecture to provide its users with use of higher frequency bands;

FIG. 6a illustrates an exemplary system, according to some implementations of the current subject matter;

FIG. 7 illustrates an exemplary method, according to some implementations of the current subject matter;

FIG. 9 illustrates an exemplary system, according to some implementations of the current subject matter; and FIG. 10 illustrates an exemplary method, according to some implementations of the current subject matter.

DETAILED DESCRIPTION

The current subject matter can provide for systems and methods that can be implemented in wireless communications systems. Such systems can include various wireless communications systems, including 5G New Radio communications systems, long term evolution communication systems, etc.

In general, the current subject matter relates to target cell prioritization for layer 1/layer 2 triggered mobility (LTM).

In some implementations of the current subject matter, target cells can be prioritized in handover (HO) from one cell (a serving cell) to another cell (a target cell) for a user equipment (UE) communicatively coupled with a base station of a wireless communication system. The prioritization can be based on a configuration of target cells. Multiple target cells may satisfy HO criteria needed for the UE to undergo Serving Cell Change (SSC) and thus be viable target cell options for HO. However, one or more of the target cells that satisfy HO criteria may have a configuration that is more similar to the configuration of the serving cell currently serving the UE than other(s) of the target cells. Prioritizing target cells based on their configuration may thus allow for a target cell to be selected for HO that allows for as little interruption in service and/or reduced service quality as possible for the UE, thereby improving user experience.

3GPP standards defining one or more aspects that may be related to the current subject matter include 3GPP TS 38.473 "NG-RAN F1 application protocol (F1AP)." Standards of the O-RAN Alliance may also be related to one or more aspects of the current subject matter.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
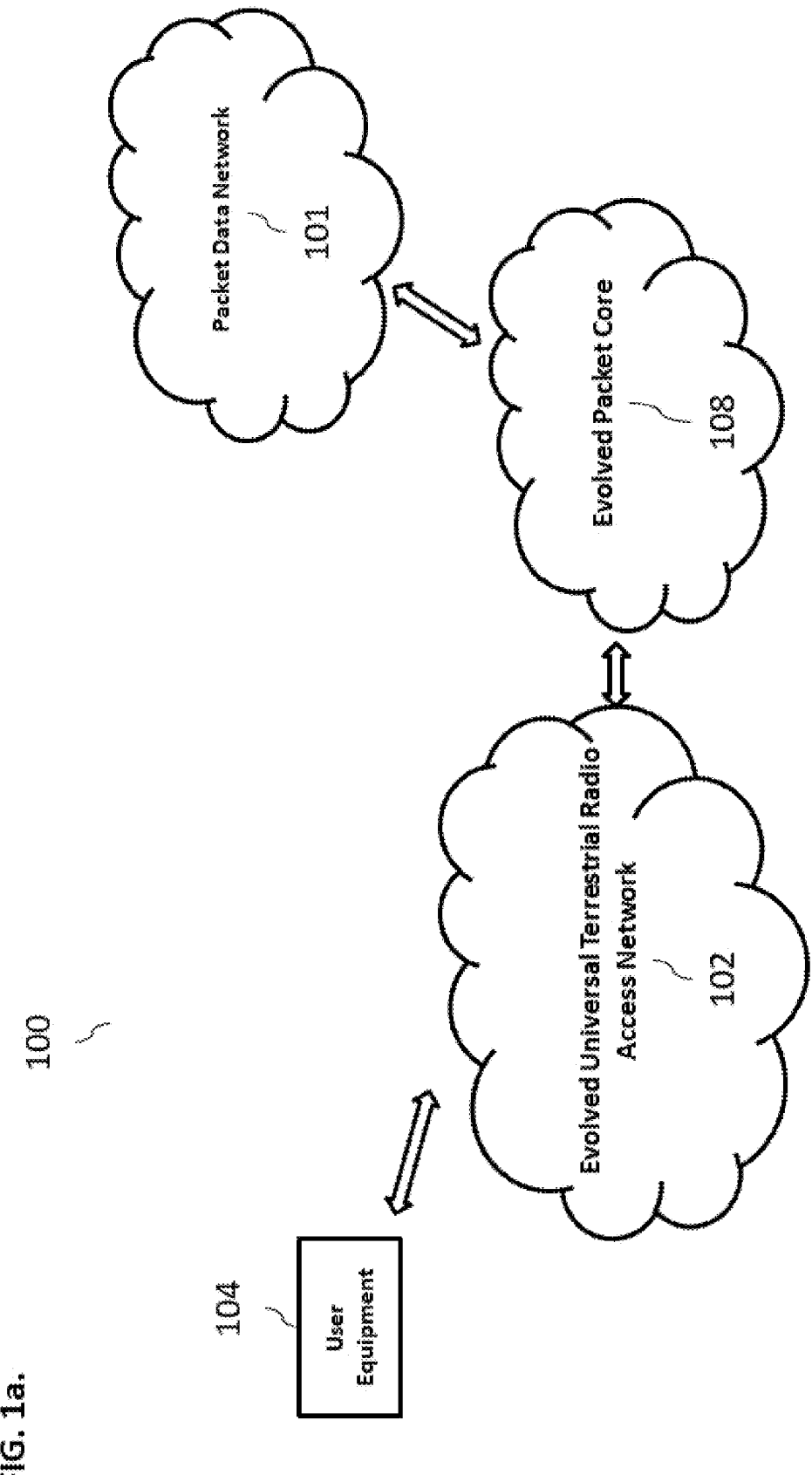
FIG. 1a illustrates an exemplary conventional long term evolution ("LTE") communications system.
Figure 1B:
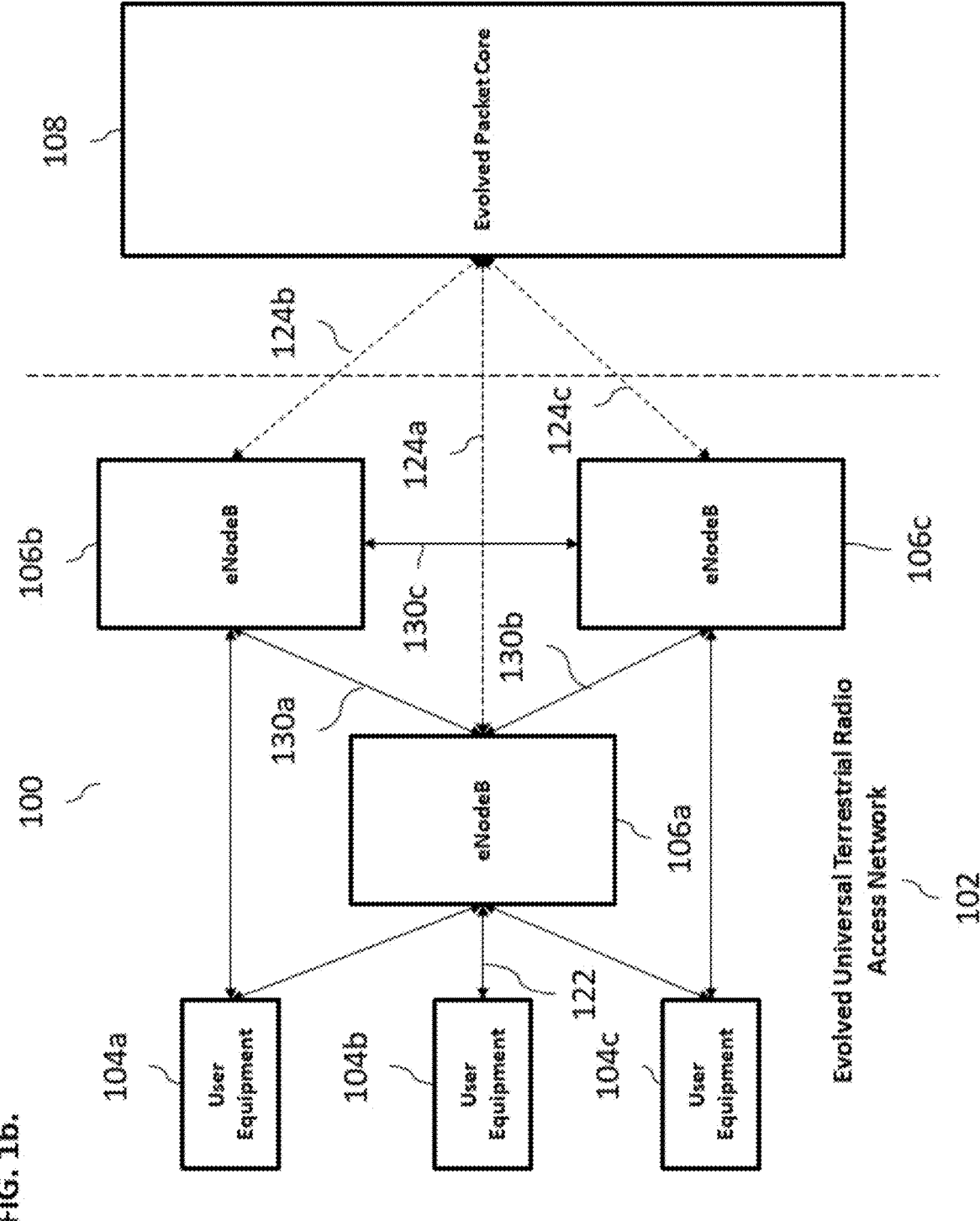

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
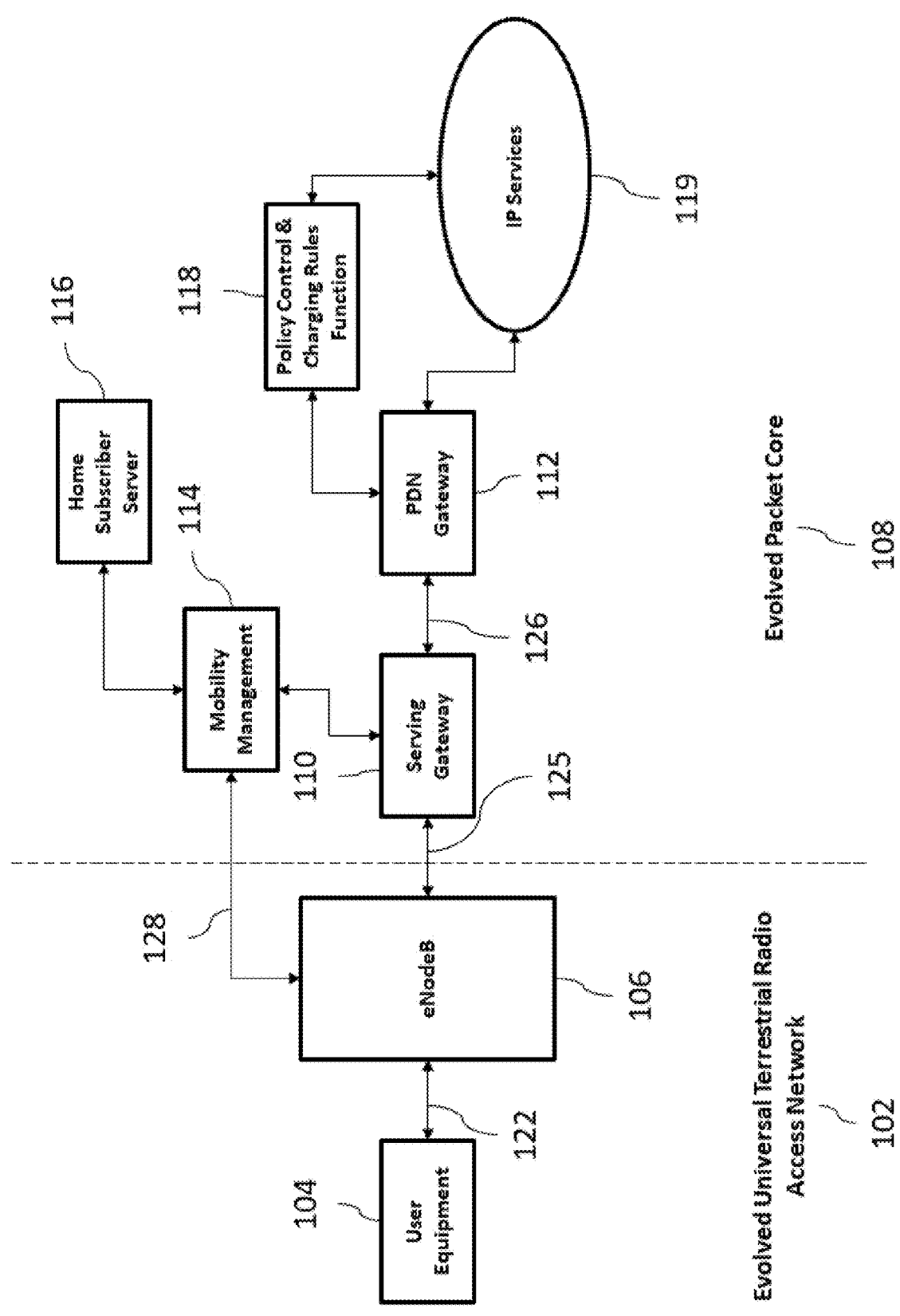

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. Ta).

Figure 1D:
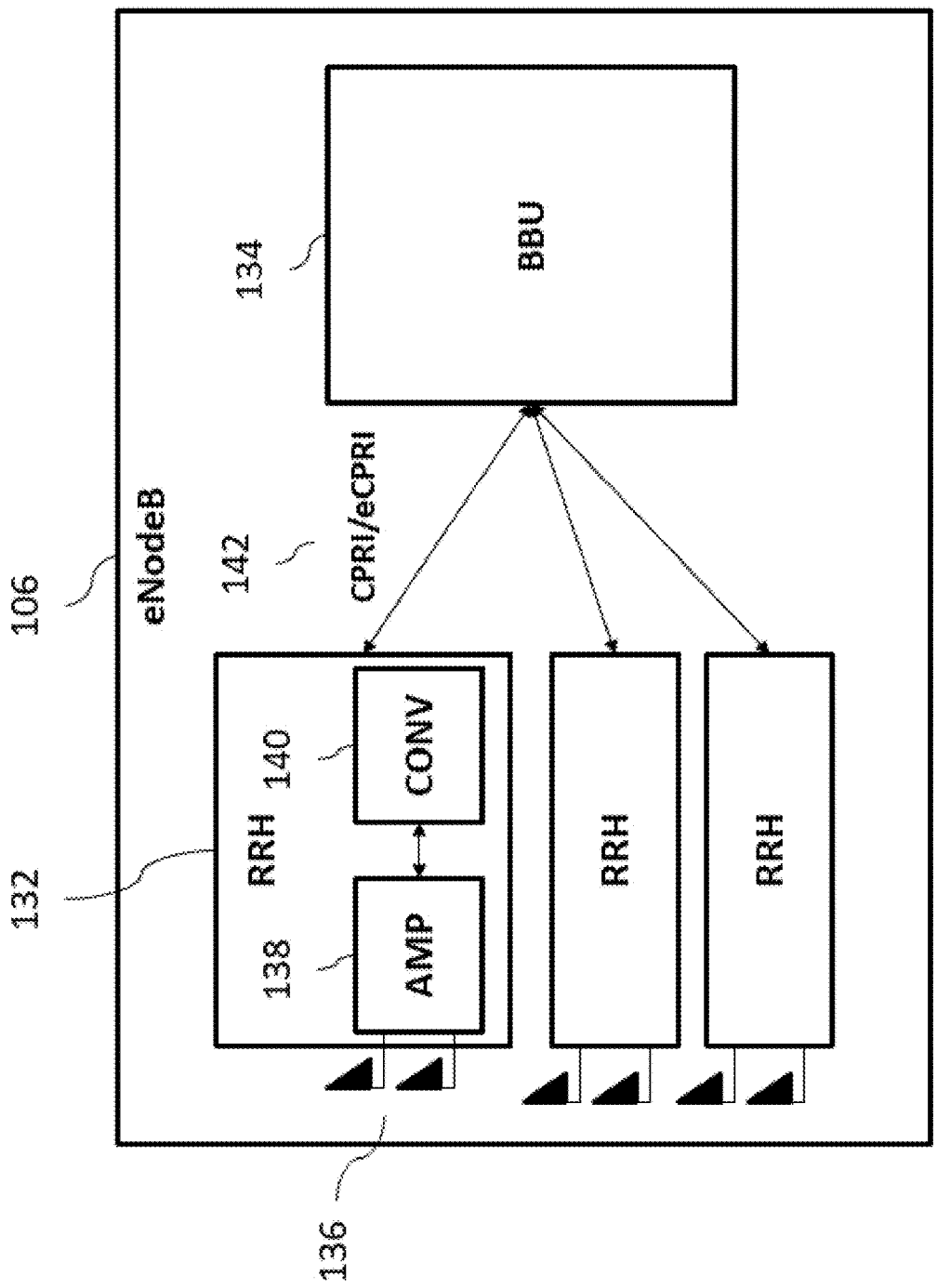

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), ST/X2 interface (1000Base-SX, 1000Base-T), and mobile environment (up to 350 km/h). The BBU 134 can be responsible for digital baseband signal processing, termination of Si line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
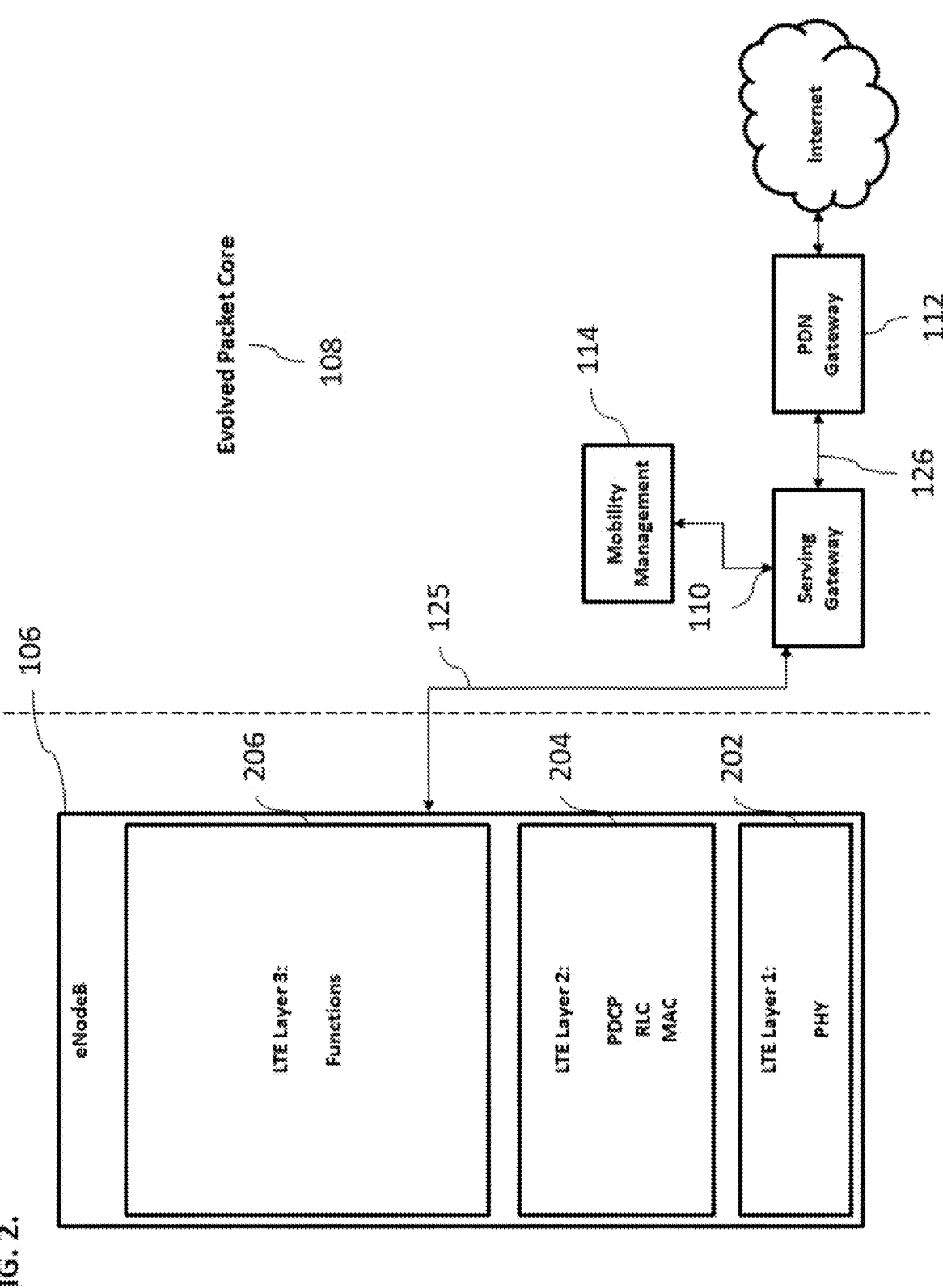
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system.

The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
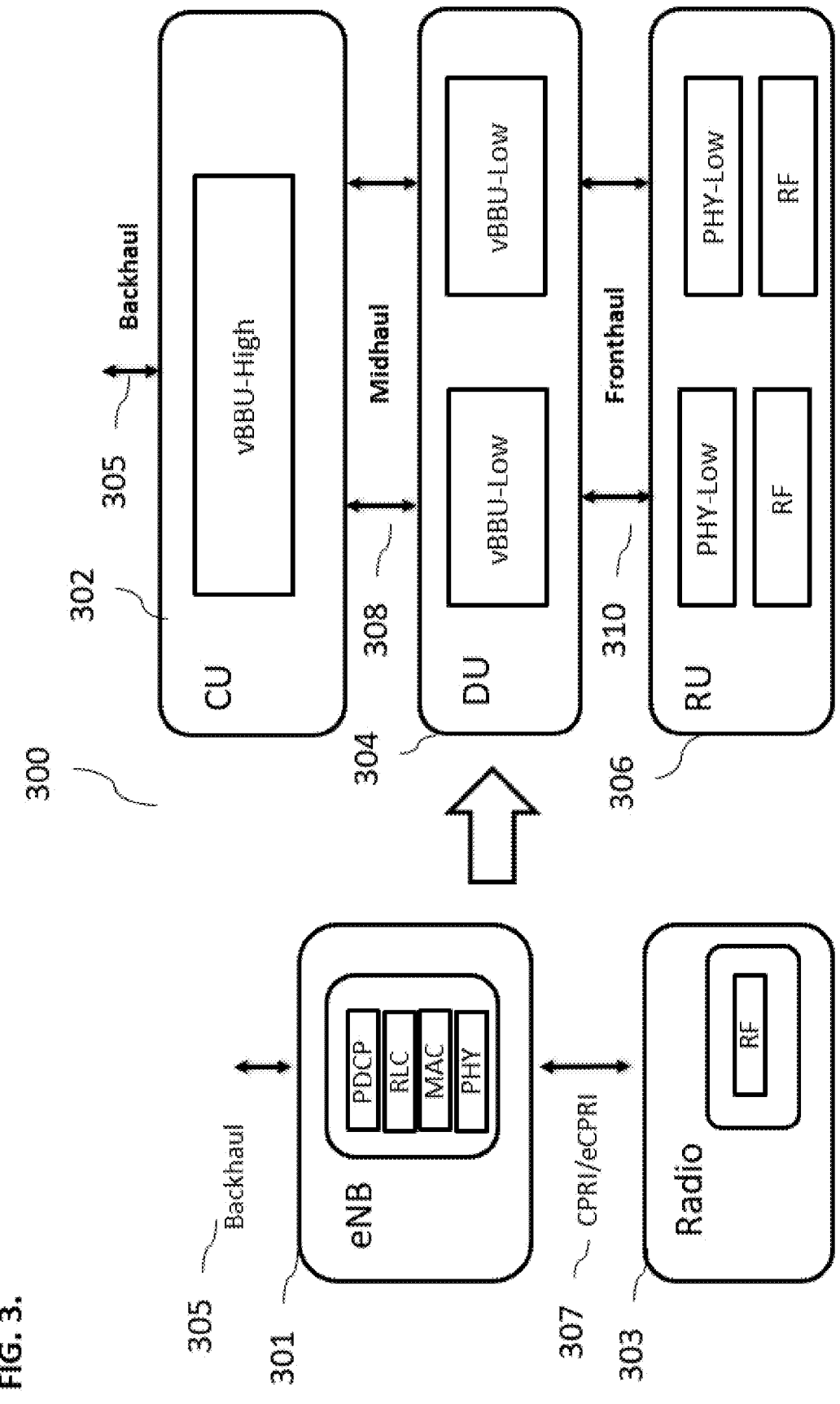
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
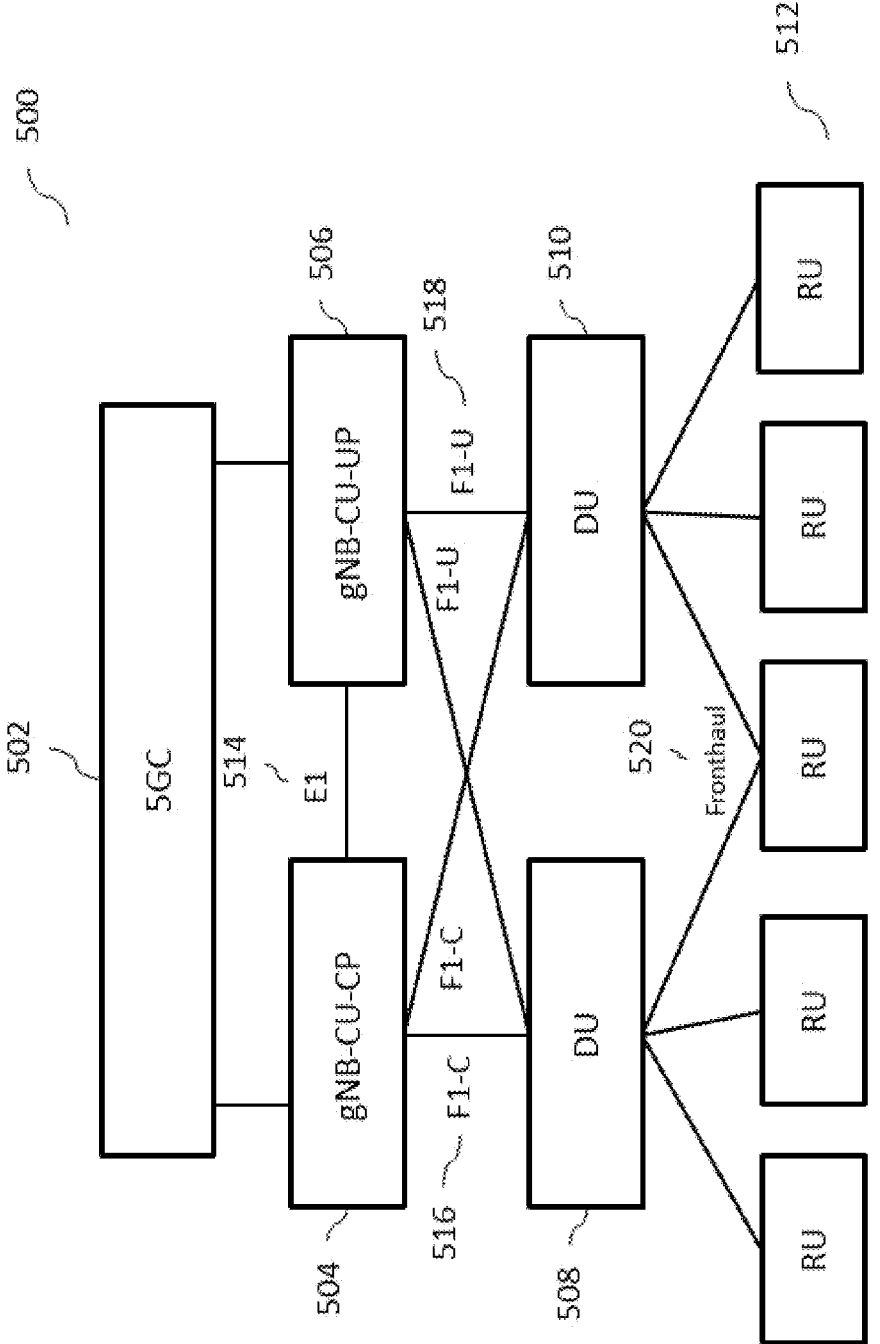
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
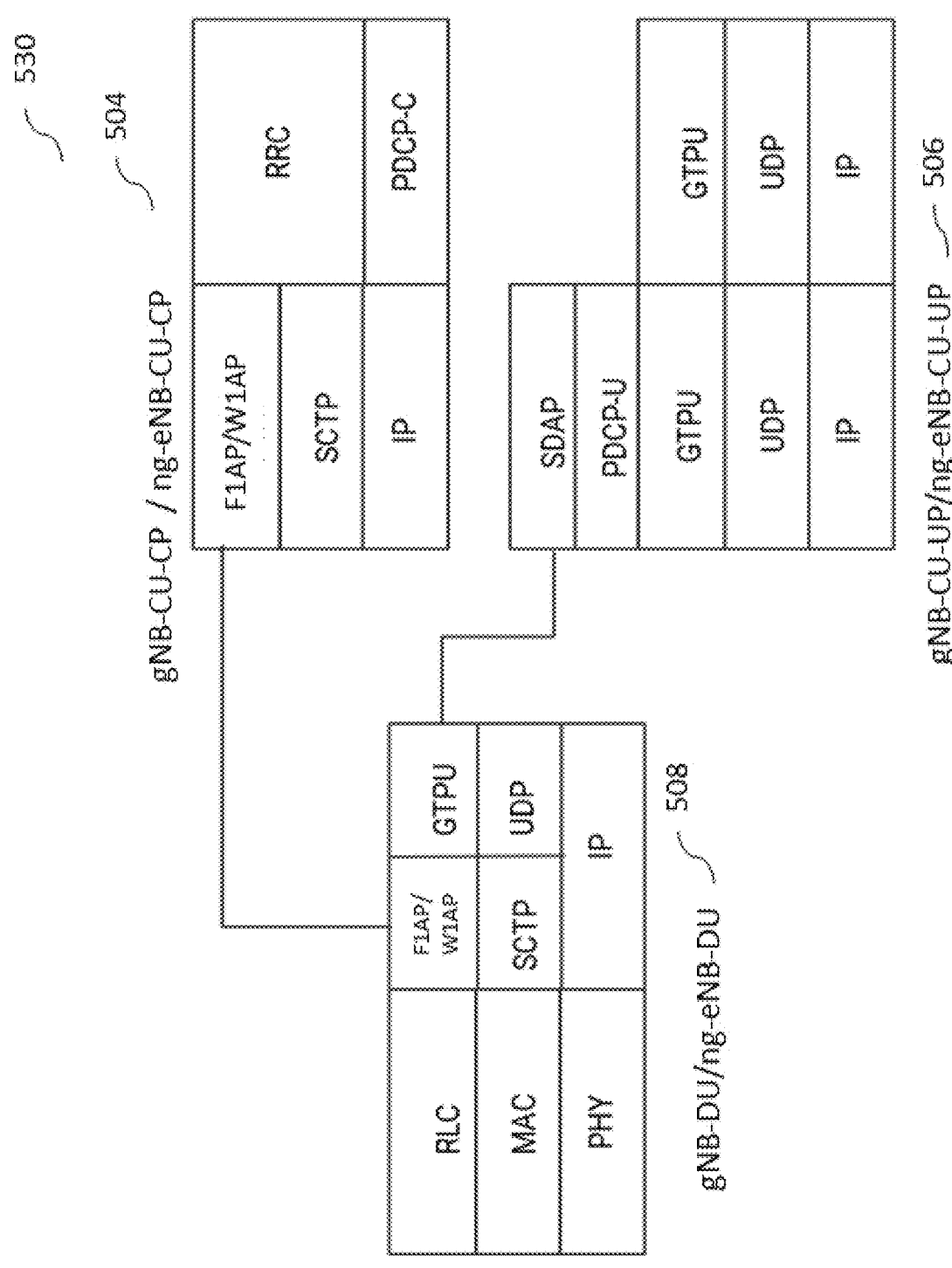
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP)

sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP, and IP sublayers.

Figure 5C:
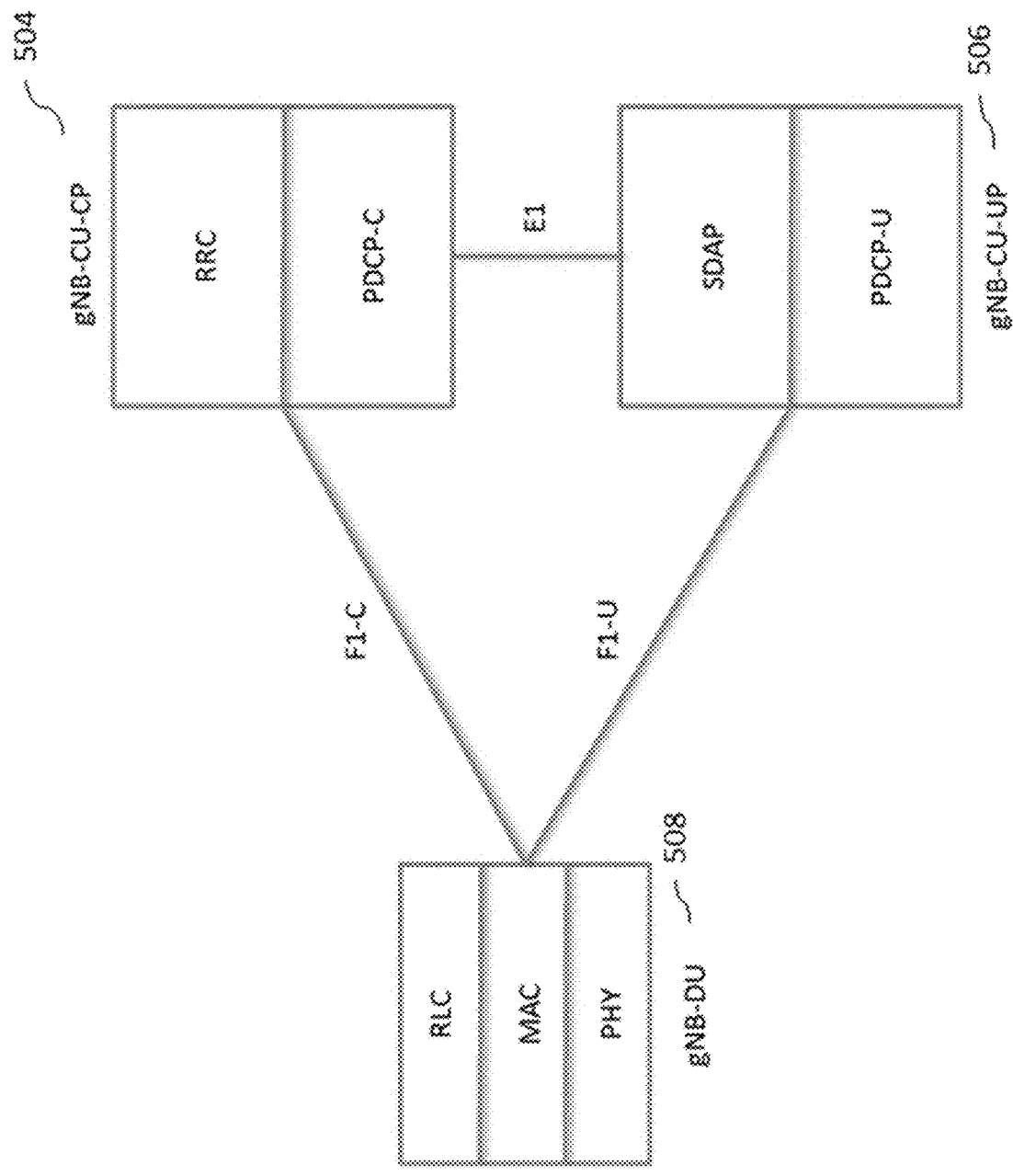
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

II. Target Cell Prioritization For L1/L2 Triggered Mobility (LTM)

Various implementations of target cell prioritization For LTM described herein can include prioritizing target cells in handover (HO) from one cell (a serving cell) to another cell (a target cell) for a user equipment (UE) communicatively coupled with a base station of a wireless communication system. The prioritization can be based on a configuration of the target cells.

Layer 1/layer 2 triggered mobility (LTM) inter-cell HO at a base station can occur by performing Serving Cell Change (SSC) from a serving cell to a target cell. Multiple target cells may satisfy HO criteria needed for the UE to undergo SSC and thus be viable target cell options for HO. However, one or more of the target cells that satisfy HO criteria may have a configuration that is more similar to the configuration of the serving cell currently serving the UE than other(s) of the target cells. Prioritizing target cells based on their configuration may thus allow for a target cell to be selected for HO that allows for as little interruption in service and/or reduced service quality as possible for the UE, thereby improving user experience.

Prioritizing target cells can include ranking each of a plurality of candidate target cells for HO based on their configuration. Currently, in accordance with 3GPP standards, a maximum of eight LTM target cells can be prepared for a given UE. In currently available scenarios, the ranking can thus include ranking up to eight target cells in order of HO preference.

One or more aspects of a cell's configuration can be considered in prioritizing target cells. One example of cell configuration is a configuration regarding guaranteed bit rate (GBR) allocation for GBR data radio bearers (DRBs). DRBs carry data or user plane traffic. A UE's GBR bearers may or may not be permitted by the target cell, such as because different vendors may configure their devices differently, because of resource availability at a time of target cell preparation, and/or because of one or more other factors. Considering target cells' GBR allocation for GBR DRBs as compared to the source (e.g., serving cell) configuration with respect to GBR allocation for GBR DRBs may help ensure that the UE will not receive a lower GBR from a target cell when handed over from the serving cell to the target cell. User experience may thus be maintained, if not improved.

Another example of cell configuration is a configuration regarding packet data unit (PDU) session to DRB mapping. DRBs map to Quality of Service (Qos) Flow Identifiers (QFIs). Each QFI can be mapped to more than one DRB. Thus, a UE having one or more PDU sessions with QFIs may be mapped to one or more DRBs in RAN. The source configuration may or may not be acceded by the target cell, such as because different vendors can have different RRM algorithms with respect to PDU session to DRB mapping), because of resource availability at a time of target cell preparation, and/or because of one or more other factors etc. Considering PDU session to DRB mapping may help ensure that DRB mapping at the target cell will not adversely affect user experience.

Another example of cell configuration is a configuration regarding a carrier configuration for carrier aggregation. A source cell can have N number of carriers configured for a UE with carrier aggregation. A target cell may have N or more carriers that could be allocated for the UE, in which case user experience may be maintained, if not improved, if service is handed over from the source cell to the target cell. However, a target call may have less than N carriers that could be allocated for the UE, in which case user experience may be adversely impacted if service is handed over from the source cell to the target cell. Considering carrier configuration for carrier aggregation may help ensure that a same or greater number of carriers could be allocated for the UE by a target cell as compared to a number of carrier allocated for the UE by the serving cell.

Another example of cell configuration is a configuration regarding slice mapping for UE services. A particular network slice available to a UE via the serving cell may not be available to the UE via a target cell because the target cell may not have access to that slice. Handing a UE's service over to the target cell may therefore result in an adverse user experience since the UE would no longer have access to that network slice and slice re-mapping would have to occur. For example, a network slice may be available for only certain UEs, such as if a company, a university or other educational institution, or other entity has a network slice available for UEs registered by or otherwise associated with its employees and/or students that is unavailable to other UEs. The serving cell may have access to such a network slice while one or more target cells may not have access to the slice. Considering slice mapping for UE services may therefore help prevent slice re-mapping and this help prevent degraded user experience.

Another example of cell configuration is a configuration regarding the UE's accepted DRBs. A serving cell may have different DRBs for a UE than those accepted at a target cell. Thus, considering the UE's DRBs accepted by a target cell as compared to the serving cell currently serving the UE may help ensure that all of the UE's DRBs currently served by the serving cell can be accepted by the target cell, thereby helping to prevent degraded user experience.

In some implementations of the current subject matter, a base station (e.g., the gNodeB of FIG. 5a, a next generation RAN (NG-RAN) node such as an eNodeB or a gNodeB, etc.) of a wireless communication system (e.g., a 5G wireless communication system, a 6G or later generation wireless communication system, etc.) can have a disaggregated architecture in which the base station includes one gNB-CU-CP (e.g., gNB-CU-CP 504 of FIGS. 5a-5c, etc.) and more than one CU-UP (e.g., gNB-CU-UP 506 of FIGS. 5a-5c, etc.) and gNB-DU (e.g., gNB-DUs 508, 510 of FIGS. 5a-5c, etc.). In general, an ng-eNodeB is enhanced as a next generation (ng) device so as to be configured to connect 5G UEs to a 5G core network. The base station can be configured to prioritize target cells as described when a UE is handed off from one cell (serving cell) of the base station to another cell (target cell) of the base station.

Figure 6A:
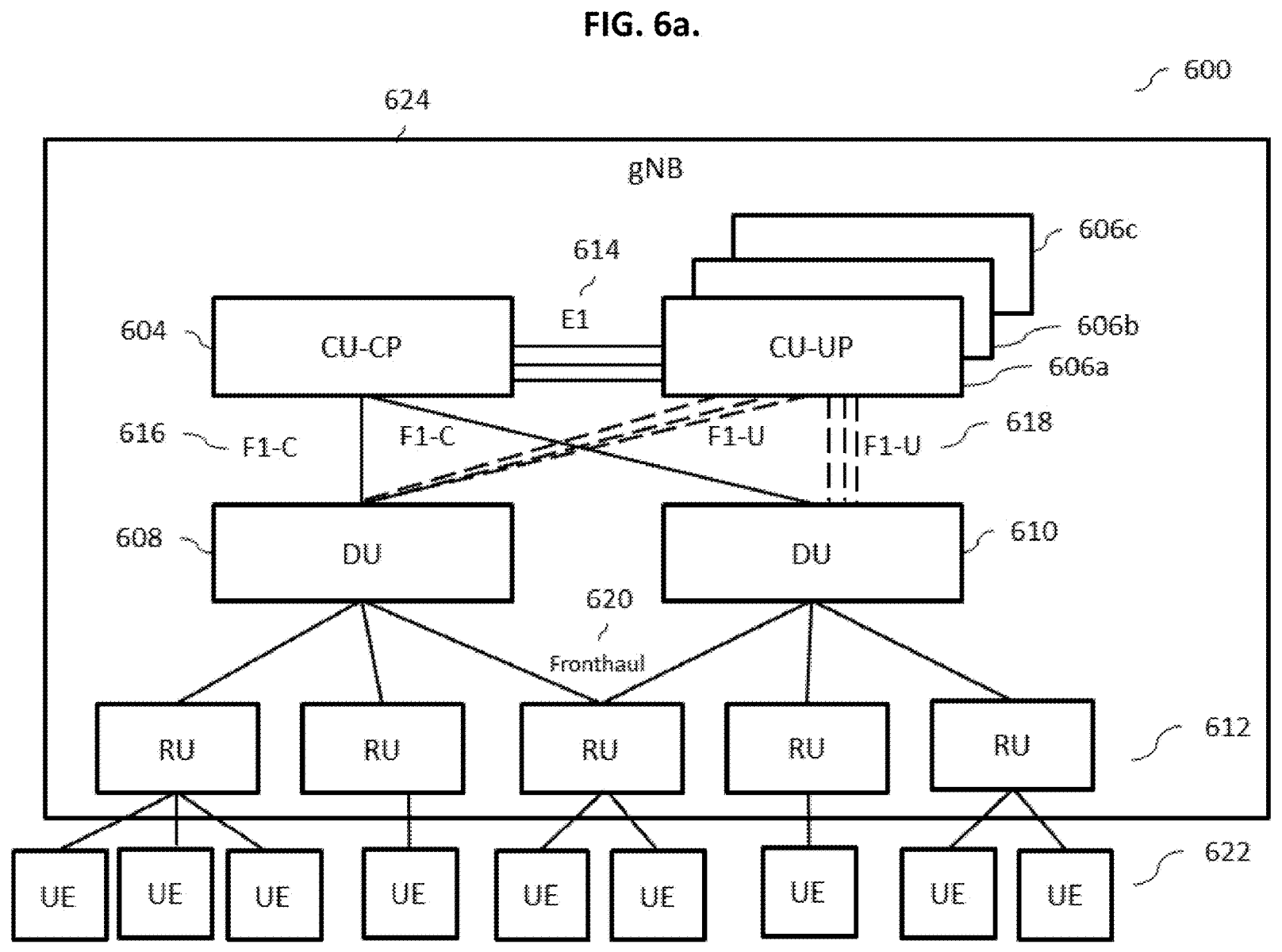

FIG. 6a illustrates an exemplary system 600 configured to prioritize target cells. The base station 602 in this illustrated implementation is a gNB configured to be in a 5G wireless communication system similar to the 5G wireless communication system 500 of FIG. 5a discussed above, but other base stations can be similarly configured and used in providing RACH-less LTM. In the illustrated implementation of FIG. 6a, the base station 602 includes a plurality of CU-UPs 606a, 606b, 606c. The base station 602 includes three CU-UPs 606a, 606b, 606c in this illustrated implementation but can include another plural number of CU-UPs. The CU of the base station 602 that includes the plurality of CU-UPs 606a, 606b, 606c is configured to be communicatively coupled with a core network (not shown in FIG. 6a), e.g., the 5GC 502 of FIG. 5a, etc.

The CU of the base station 602 also includes a CU-CP 604 configured to be communicatively coupled to the CU's user plane portion 606a, 606b, 606c using an E1 communication interface 614. The E1 interface 614 includes three communication links in this illustrated implementation to reflect that there are three CU-Ups 606a, 606b, 606c with which the CU-CP 604 can be configured to communicate.

The base station 602 also includes a plurality of DUs 608, 610. The base station 602 includes two DUs 608, 610 in this illustrated implementation but can include another plural number of DUs. The CU-CP 604 is configured to be communicatively coupled to the DUs 608, 610 using F1-C communication interfaces 616. The CU-UPs 606a, 606b, 606c are configured to be communicatively coupled to the DUs 608, 610 using F1-U communication interfaces 618. The F1-U interface 618 associated with each of the DUs 608, 610 includes three communication links in this illustrated implementation to reflect that there are three CU-UPs 606a, 606b, 606c with which each DU 608, 610 can be configured to communicate.

The base station 602 also includes a plurality of RUs 612. The base station 602 includes five RUs 612 in this illustrated implementation but can include another plural number of RUs. The RUs 612 are configured to be communicatively coupled to the DUs 608, 610 via a fronthaul network 620. Additionally, each of the RUs 612 is configured to be communicatively coupled to one or more UEs 622. In this illustrated implementation, two of the RUs 612 are shown communicatively coupled to one UE 622, two of the RUs 612 are shown communicatively coupled to two UEs 622, and one of the RUs 612 is shown communicatively coupled to three UEs 622, but each of the RUs 612 can be coupled to another number of UEs same or different from any of the other RUs 612.

Target cell prioritization can be configured to occur when one of the UEs communicatively coupled with the base station 602 is handed off from one of the DUs 608, 610 of the base station 602 to the other of the DUs 608, 610 also of the same base station 602. The one of the DUs 608, 610 currently providing service to the UE 622 is referred to as a "serving DU" due to it currently providing service to the UE 622, e.g., currently serving the UE 622. The one of the DUs 608, 610 to which the UE's service is being handed off is referred to as a "target DU" due to it being targeted to provide service to the UE 622.

Figure 6B:
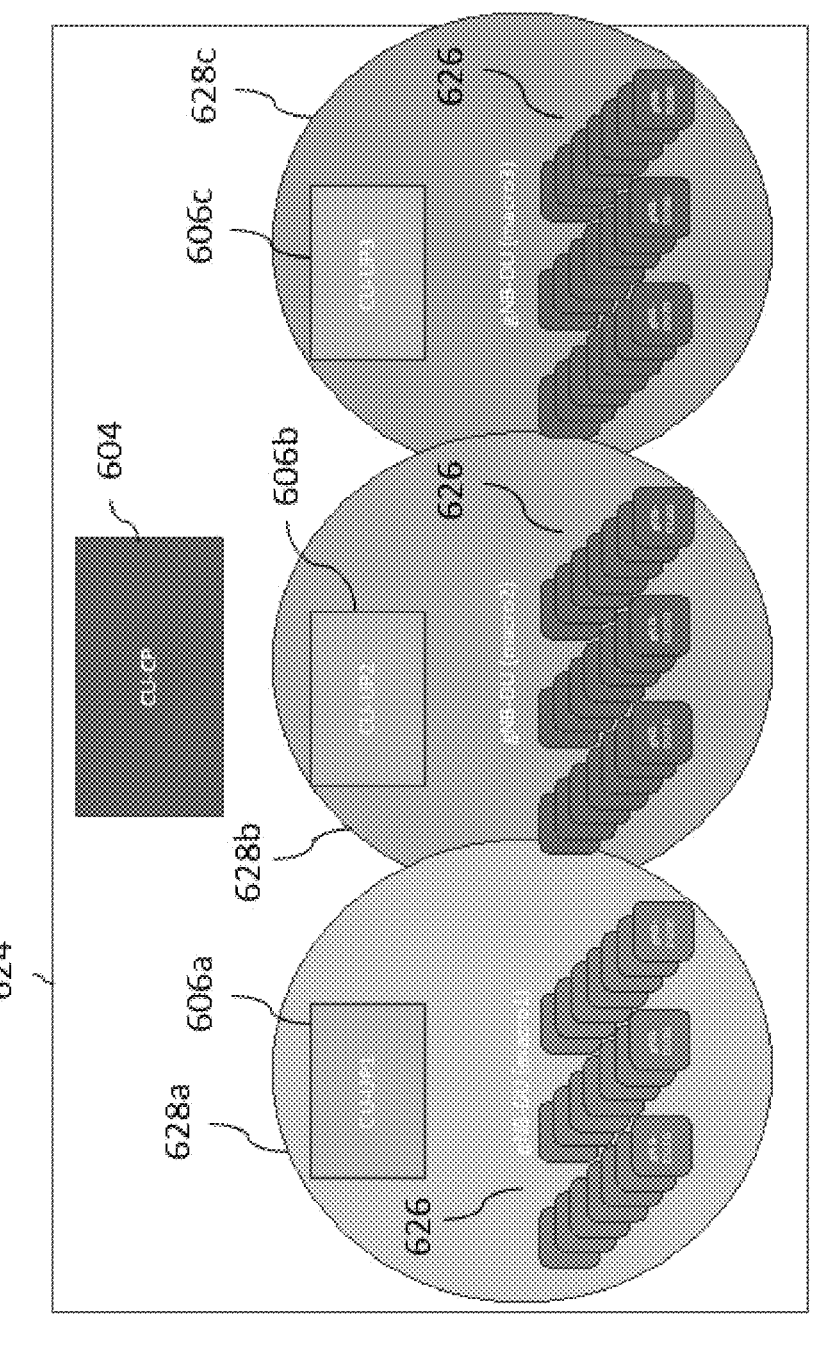
FIG. 6b illustrates an exemplary alternate configuration of the system of FIG. 6a, according to some implementations of the current subject matter.

A system in which prioritization of target cells can be configured to occur is further described with respect to FIG. 6b. FIG. 6b illustrates the CU-CP 604 and the CU-UPs 606a, 606b, 606b of FIG. 6a, but in the illustrated implementation of FIG. 6b, the base station 624 includes more than two DUs. In the illustrated implementation of FIG. 6b, the base station 624 includes sixty-six DUs. Three of the DUs 628a, 628b, 628c are macro cells (labeled macro1, macro2, and macro3 in FIG. 6b), and sixty-three of the DUs 626 are small cells (nine of which are labeled in FIG. 6b as gNB-DU10, gNB-DU20, gNB-DU30, gNB-DU40, gNB-DU50, gNB-DU60, gNB-DU70, gNB-DU80, and gNB-DU90). The base station 624 can include another number of macro cells and/or another number of small cells. The macro1 DU 628a, the macro2 DU 628b, and twenty-one of the small cell DUs 626 including gNB-DU10, gNB-DU20, and gNB-DU30 are configured to be served by the first CU-UP 606a (labeled CU-UP1 in FIG. 6b). The macro1 DU 628a, the macro2 DU 628b, the macro3 DU 6280c, and twenty-one of the small cell DUs 626 including gNB-DU40, gNB-DU50, and gNB-DU60 are configured to be served by the second CU-UP 606b (labeled CU-UP2 in FIG. 6b). The macro2 DU 628b, the macro3 DU 628c, and twenty-one of the small cell DUs 626 including gNB-DU70, gNB-DU80, and gNB-DU90 are configured to be served by the third CU-UP 606c (labeled CU-UP3 in FIG. 6b).

In the implementation shown in FIG. 6b, each CU-UP 606a, 606b, 606c is serving a subset of DUs 626, 628a, 628b, 628c for all the services. However, a CU-UP can serve all the DUs of the base station for one service (e.g., enhanced mobile broadband (eMBB)), while serving a subset of the DUs for another service (e.g., vehicle-to-everything (V2X) or ultra-reliable low latency communication (URLLC)).

Figure 8:
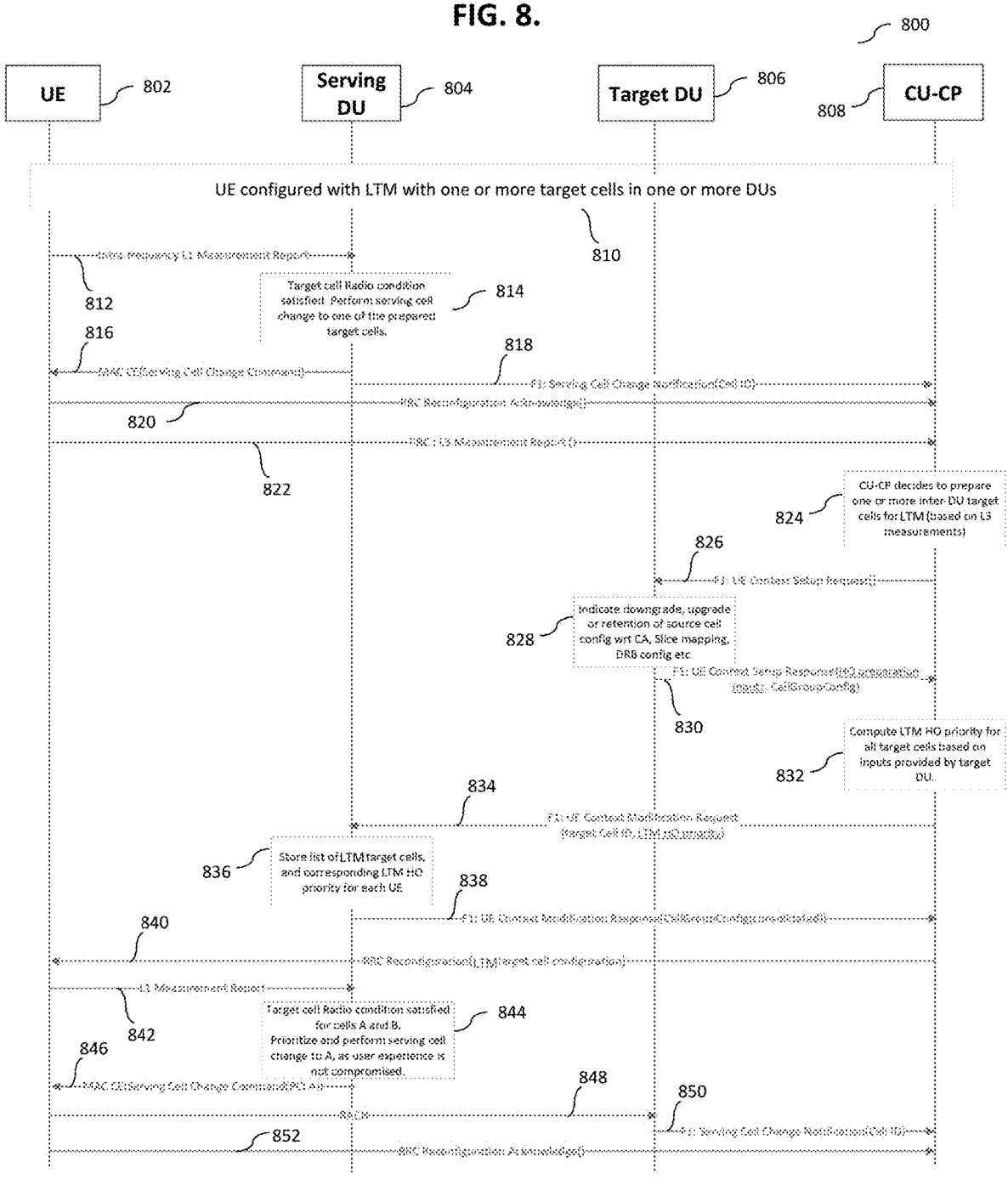
FIG. 8 illustrates another exemplary system, according to some implementations of the current subject matter.

FIG. 7 illustrates an exemplary method 700, according to some implementations of the current subject matter. The method 700 is described with respect to an exemplary system 800 illustrated in FIG. 8 but can be implemented similarly with other systems, e.g., the system 100 of FIGS. 1*a*-1*c* and 2, the system 400 of FIG. 4, the system 500 of FIG. 5*a*, the systems of FIGS. 6*a* and 6*b*, etc. The system 800 of FIG. 8 is a 5G system, but as mentioned above, prioritization of target cells as described herein can be performed with other types of wireless communications systems, such as LTE wireless communications systems or 6G or later generation wireless communications systems.

In the system 800, a UE 802 (e.g., UE 104 of FIGS. 1*a*-1*c*, UE 622 of FIG. 6*a*, etc.) is configured 810 with LTM with one or more target cells in one or more DUs 804, 806 (e.g., DU 508 of FIGS. 5*a*-5*c*, DU 510 of FIG. 5*a*, DU 608 of FIG. 6*a*, DU 610 of FIG. 6*a*, DUs 626 of FIG. 6*b*, DUs 628*a*, 628*b*, 628*c*, of FIG. 6*b*, etc.) of a base station, e.g., a gNB (e.g., gNodeB of FIG. 5*a*, gNodeB 624 of FIGS. 6*a* and 6*b*, etc.). For ease of explanation the system 800 is shown in FIG. 8 with one UE 802 communicatively coupled to the base station and with the base station including two DUs 804, 806, but more than one UE can be communicatively coupled to the base station and/or the base station can include more than two DUs. The base station of the system 800 also includes a CU including a CU-CP 808 (e.g., gNB-CU-CP 504 of FIGS. 5*a*-5*c*, CU-CP 604 of FIGS. 6*a* and 6*b*, etc.) and one or more CU-UPs (e.g., gNB-CU-UP 506 of FIGS. 5*a*-5*c*, CU-UPs 606*a*, 606*b*, 606*c* of FIGS. 6*a* and 6*b*, etc.) (not shown in FIG. 8), and a plurality of RUs (e.g., RUs 512 of FIG. 5*a*, RUs 612 of FIG. 6*a*, etc.) (not shown in FIG. 8). The UE 802 is currently being served by the serving DU 804. Additionally, the base station of FIG. 8*a* is communicatively coupled with a core network (e.g., EPC 108 of FIGS. 1*a*-1*c* and 2, 5GC 502 of FIG. 5*a*, etc.) (not shown in FIG. 8).

The method 700 shows an implementation of an inter-DU LTM serving cell change scenario which includes the serving DU 804 determining 702 that a cell change for the UE 802 is needed, but the method 700 also applies to an intra-DU LTM serving cell change scenario and a combination inter-DU and intra-DU serving cell change scenario. The serving DU's determination 702 can include the serving DU 804 analyzing 814 an intra-frequency L1 measurement report transmitted 812 by the UE 802, in accordance with 3GPP standards, to the serving DU 804. In accordance with 3GPP standards, the intra-frequency L1 measurement report can include layer 1 (L1) measurements that can be analyzed by the serving DU 804 in making resource control decisions, which can include a serving cell change in which the UE 802 is to be served by a DU, e.g., the target DU 806, other than the serving DU 804 for at least one service.

In response to determining 702 that a serving cell change should occur, the serving DU 804 notifies 704 the UE 802 of a serving cell change. As shown in FIG. 8, the notification 704 to the UE 802 can include the serving DU 804 transmitting 816 a serving cell change command, e.g., a MAC CE, to the UE 802.

Also in response to determining 702 that a cell service change should occur, the serving DU 804 notifies 704 the CU-CP 808 that that a serving cell change for the UE 802 has occurred. The notification 704 can thus identify the UE 802 to the CU-CP 808, such as with an identifier, in accordance with 3GPP standards, known to the serving DU 804 that uniquely identifies the UE 802 to the CU-CP 808. As shown in FIG. 8, the notification 704 to the CU-CP 808 can include the serving DU 804 transmitting 818 a Serving Cell Change Notification message to the CU-CP 808 using an F1 communication interface. As also shown in FIG. 8, the Serving Cell Change Notification message includes a cell identification (ID) that can be associated with the UE 802 that underwent the serving cell change.

In response to receiving the serving cell change command 704 from the serving DU 804 and executing the serving cell change command, the UE 802 transmits 820 a Radio Resource Control (RRC) Reconfigure Acknowledgement message to the CU-CP 808. The CU-CP 808 becomes aware from RRC Reconfigure Acknowledgement message that the UE 802, uniquely identified to the CU-CP 808 by the serving DU 804, acknowledges completion of a successful serving cell change.

Also in response to receiving a layer 3 RRC measurement configuration, the UE 802 transmits 822 an RRC measurement report to the CU-CP 808, in accordance with 3GPP standards. In accordance with 3GPP standards, the RRC measurement report can include layer 3 (L3) measurements that can be analyzed by the CU-CP 808 in making resource control decisions, which can include deciding 824 to prepare at least one target DU cell for LTM so the at least one target cell from the target DU 806 is ready to serve the UE 802 instead of the serving DU 804 for at least one service.

In response to deciding 824 to prepare at least one target cell for LTM, the CU-CP 808 prepares 706 at least one target cell for LTM. As shown in FIG. 8, in this illustrated implementation, each of the at least one target cells is an inter-DU target cell, e.g., is part of a different DU than the serving DU 804 where the same CU (e.g., the CU that includes the CU-CP 808) serves each DU 804, 806. Also in this illustrated implementation, the at least one target cell includes only the target DU 806 since there are only two gNB-DUs, but as mentioned above, the base station can include more than two target cells. Currently, in accordance with 3GPP standards, a maximum of eight LTM target cells can be prepared for a given UE.

Preparing 706 the at least one target cell for LTM can include notifying the at least one target DU 806 that the at least one target DU 806 may be later notified to begin providing service to the UE 802 for at least one service. The target DU 806 can thus reserve necessary resources for the UE 802. As shown in FIG. 8, the preparation 706 of the at least one target cell, which in this illustrated implementation is only the target DU 806, can include the CU-CP 808 transmitting 826 a UE Context Setup Request message to the target DU 806, in accordance with 3GPP standards, using an F1 communication interface.

In response to receiving the UE Context Setup Request message from the CU-CP 808, the target DU 806 prepares 828 each of the at least one target cells for LTM. In this illustrated implementation the at least one target cell includes only the target DU 806 preparing 828 target cells. The preparation 828 can include the target cell reserving necessary resources for the UE 802. The preparation 828 can also include identifying HO preparation inputs, which include a configuration for each target cell. The configuration for each target cell includes one or more of the configurations discussed above, e.g., a configuration regarding GBR allocation for GBR DRBs, a configuration regarding PDU session to DRB mapping, a configuration regarding a carrier configuration for carrier aggregation, a configuration regarding slice mapping for UE services, and a configuration regarding accepted DRBs.

The target DU 806 notifies the CU-CP 808 that the preparation 828 has been completed. As shown in FIG. 8, the notification to the CU-CP 808 can include the target DU 806 transmitting 830 a UE Context Setup Response message to the CU-CP 808, in accordance with 3GPP standards, using an F1 communication interface. As also shown in FIG. 8, the UE Context Setup Response message includes consolidated cell group configuration information for the one or more target cells prepared at the target DU 806 and also includes HO preparation inputs. The CU-CP 808 is therefore made aware of the configuration for each of the one or more prepared 828 target cells and any changes to the serving cell configuration.

The CU-CP 808 determines 708, 832 an LTM HO priority for each of the one or more prepared 828 target cells. If there is only one prepared 828 target cell, the CU-CP 808 omits the determination 708, 832 since there is only one target cell candidate. If there are a plurality of prepared 828 target cells, the CU-CP 808 performs the determination 708, 832 since there are at two candidate target cells available for HO priority ranking. The determination 708, 832 can include comparing each of the received target cell configurations with serving cell configuration as reflected by expected UE service requirements, e.g., based on the received L3 measurement report. Different vendors may decide to give higher weight to some configuration factors than others, e.g., considering maintaining GBR allocation for GBR DRBs more important and thus deserving of a higher priority than maintaining a configuration regarding PDU session to DRB mapping, considering a configuration regarding a carrier configuration for carrier aggregation more important and thus deserving of a higher priority a configuration regarding slice mapping for UE services, giving a target cell where multiple QFIs are mapped to the same DRB or the number of configured secondary carriers (SCells) are reduced or some DRBs of a slice are re-mapped to a default slice a lower priority compared to a target cell where the source cell configuration is not degraded or is enhanced, etc., based on which factors the vendor considers to be more important to maintain for the best user experience upon HO than other factors.

The CU-CP 808 assigns a priority value to each of the target cells based on the determined 708, 832 priority. The priority value can be numerical (e.g., 1 for a highest priority, 2 for a second highest priority, etc.), can be alphabetical (e.g., A for a highest priority, B for a second highest priority, etc.), or can be in another format.

The CU-CP 808 can be configured to receive updated target cell information and readjust LTM HO priority based on the updated information. If a target cell's configuration changes (improves or degrades), the target DU 806 can transmit updated target cell configuration information to the CU-CP 808. If a target cell becomes unavailable for LTM HO, the target DU 806 can transmit an update to the CU-CP 808 indicating that this target cell is no longer available for LTM HO. If a target cell becomes available for LTM HO, the target DU 806 can transmit an update to the CU-CP 808 including this target cell's configuration information and indicating that this target cell is available for LTM HO.

The CU-CP 808 notifies 710 the serving DU 804 of the LTM-prepared at least one target cell by identifying each of the one or more LTM-prepared target cells and their LTM HO priority. In an inter-DU LTM scenario, one or more of the at least one LTM-prepared target cells belong to a different DU than the serving DU 806. For example, with reference to the system of FIG. 6b, the serving DU can be a small cell 626 of macro1 DU 628a, and one or more of the target cells can be one or more small cells 626 of macro2 DU 628b and/or macro3 DU 628c.

As shown in FIG. 8, the notification 710 to the serving DU 804 can include the CU-CP 808 transmitting 834 a UE Context Modification Request message to the serving DU 804 using an F1 communication interface. The UE Context Modification Request message can include for each of the one or more target DUs cell identification information (e.g., a unique cell ID that identifies the target DU cell such as a physical cell identifier (PCI)) and LTM HO priority information (e.g., the numerical, alphabetical, etc. ranking assigned to each target cell indicative of the target cell's priority for HO). If there is only one candidate target cell, the priority information can be omitted from the message to the serving DU 804 from the CU-CP 808 since there is only one possible choice for HO identified to the serving DU 804.

In response to being notified 710 of the at least one LTM prepared target DU cell, the serving cell 804 stores 836 the received information regarding the at least one LTM target cell, e.g., stores a list of the LTM-prepared target cell(s) and their respective LTM HO priority information. Also in response to being notified 710 of the at least one target DU, the serving cell 804 transmits 838 a UE Context Modification Response message to the CU-CP 808 using an F1 communication interface. The UE Context Modification Response message may include consolidated cell group configuration information for each the one or more target cells identified to the UE 802 by the CU-CP 808. The UE Context Modification Request message and the UE Context Modification Response message are each defined by 3GPP. The serving DU 804 can thus receive information regarding the at least one target cell from the CU-CP 808, and can acknowledge the receipt to the CU-CP 808, using messages already transmitted for HO in accordance with 3GPP standards.

In response to receiving the UE Context Modification Response message, the CU-CP 808 transmits 840 an RRC reconfiguration message to the UE 802, in accordance with 3GPP standards. As shown in FIG. 8, the RRC reconfiguration message includes LTM target cell configuration information, e.g., as provided to the CU-CP 808 from the target DU 806 in the transmitted 830 UE Context Setup Response message.

In response to receiving the target cell configurations in the RRC reconfiguration message, the UE 802 transmits 842 an L1 measurement report to the serving DU 804, in accordance with 3GPP standards. The L1 measurement report provides the UE measured radio condition information of the configured target cells to the serving DU 804.

In response to receiving the L1 measurement report transmitted 842 from the UE 802, the serving cell 804 selects 712, 844 a target cell, from among the one or more LTM-prepared target cells identified to the serving DU 804. When there is only one target cell identified to the serving DU 804 by the CU-CP 808 as an LTM-prepared target cell, the serving cell's selection 710, 844 is straightforward, with the serving DU 804 selecting 710, 844 the one candidate target cell.

When there are a plurality of target cells identified to the serving DU 804 by the CU-CP 808, the serving cell's target cell selection 710, 846 can include determining which one or more of the plurality of target cells has a radio quality above a predetermined threshold radio quality. The predetermined threshold radio quality is defined by the UE's radio condition that the serving DU 804 received from the UE 802 in the L1 measurement report. The serving DU 804 can thus take into consideration particular needs of the particular UE 802 involved in the HO when selecting 712, 844 a target cell for the HO. Additionally, the L1 measurement report transmitted 842 by the UE 802 to the serving DU 804 reports L1 measurements, which can include reference signal received power (RSRP) as defined by 3GPP, for each of the plurality of target cells, whose identities are known by the UE 802 as having been provided to the UE 802 by the CU-CP 808 in the RRC reconfiguration message. The serving DU 804 can therefore analyze the L1 measurement report received from the UE 802 to determine which one or more of the plurality of target cells has a radio quality above a predetermined threshold radio quality.

If only one of the plurality of target cells satisfies the UE's radio condition, e.g., only one of the target cells' radio qualities is above the predetermined threshold radio quality, then the serving cell 804 selects 712, 844 that target cell. If more than one of the plurality of target cells satisfies the UE's radio condition, e.g., the target cells' radio qualities are each above the predetermined threshold radio quality, then any one of these target cells would be able to serve the UE's needs and one of these target cells can be selected according to the LTM HO priority information that the serving DU 804 received from the CU-CP 808 by selecting the one of the target cells (that satisfy the radio conditions) with a highest priority ranking. In the illustrated implementation of FIG. 8, target cell A of the target DU 806 and target cell B of the target DU 806 have each been identified by the serving DU 804 as satisfying the radio conditions, and target cell A is selected 712, 844 to be target cell for HO because target cell A has a higher priority ranking than target cell B in the LTM HO priority received by the serving DU 804 and is therefore less compromised for user experience than target cell B. Thus, even if target cell B has better radio conditions than target cell A, target cell A is selected for HO due to its higher LTM HO priority.

Having selected 712, 844 the target cell, the serving DU 804 triggers 714 serving cell change to the selected 713, 844 target cell. As shown in FIG. 8, triggering 712 the serving cell change can include the serving DU 804 transmitting 846 a MAC CE to the UE 802 that includes a serving cell change command and identifies, e.g., by PCI, the selected 712, 844 target cell to the UE 802.

The UE's receipt of the MAC CE indicates to the UE 802 that LTM serving cell change (SCC) has to be performed to the identified target cell for the UE 802. Thus, in response to receiving the MAC CE from the serving cell 804, the UE 802 begins 716, 848 HO to the target cell. As shown in FIG. 8, the UE 802 beginning 716, 848 HO to the target cell can include the UE 802 accessing 848 the target cell with a RACH message, which can be performed in accordance with 3GPP standards. In response to the UE 802 accessing the target cell, the target DU 806 transmits 850 a serving cell change notification to the CU-CP 808, via an F1 communications interface, that identifies, e.g., by unique identifier per 3GPP, as the new, current serving cell for the UE 802 for at least one service. Also in response to receiving the MAC CE from the serving cell 804, the UE 802 transmits 852 an RRC reconfiguration acknowledgment message to the CU-CP 808. The CU-CP 808 therefore receives acknowledgment from both the UE 802, via the RRC reconfiguration acknowledgment message indicating a successful RRC reconfiguration at the UE 802, and the target DU 806, via the serving cell change notification, that the target DU 806 is now serving the UE 802 for at least one service that has been handed over from the serving DU 804.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

FIG. 10 illustrates an exemplary method 1000 for target cell prioritization for LTM, according to some implementations of the current subject matter. The method 1000 may be performed, for example, using implementations shown in and described with respect to FIGS. 6a-8.

The method 1000 includes receiving 1002, at a serving DU of a base station from a CU-CP of the base station, information indicating a handover priority ranking of a plurality of LTM target cells of a second DU of the base station, and selecting 1004, at the serving DU and based on the received information, one of the plurality of LTM target cells for handover of service for a UE from the serving DU, and triggering the handover of the service for the UE from the serving DU to the selected target cell. Each of the plurality of LTM target cells from which the serving DU selects satisfies handover criteria.

In some implementations, the current subject matter can include one or more of the following optional features.

In some implementations, the handover priority ranking can be based on a target cell configuration of each of the plurality of LTM target cells. Further, the target cell configuration of each of the plurality of LTM target cells can include at least one of a configuration regarding GBR allocation for GBR DRBs, a configuration regarding PDU session to DRB mapping, a configuration regarding a carrier configuration for carrier aggregation, a configuration regarding slice mapping for UE services, and a configuration regarding the UE's accepted DRBs; and/or the handover priority ranking can be based on the configuration of each of the plurality of LTM target cells compared to a configuration of the serving cell. Further, at least one target DU including the plurality of LTM target cells can provide the target cell configuration for each of the plurality of LTM target cells to the CU-CP in an F1 message, and/or the handover priority ranking can be re-computed whenever an LTM target cell is added, reconfigured, or removed for the UE. Further, the at least one target DU can also provide a list of changes for the plurality of LTM target cells compared to a serving cell configuration.

In some implementations, the handover criteria can include a predetermined threshold radio quality, the operations can further include determining, at the serving DU, which one or more of the plurality of target cells has a radio quality above the predetermined threshold radio quality, and the selection can be among only the one or more determined target cells.

In some implementations, the triggering can include transmitting, from the serving DU to the UE, a MAC CE message.

In some implementations, the base station can have a disaggregated architecture.

In some implementations, the base station can include a Next Generation Radio Access network (NG-RAN) node. Further, the NG-RAN node can include a gNodeB or an ng-eNodeB.

In some implementations, the base station can include at least one processor and at least one non-transitory storage media storing instructions that, when executed by the at least one processor, cause the at least one processor to perform the method.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
at least one processor, and
at least one non-transitory storage media storing instructions that, when executed by the at least one processor, cause the at least one processor to perform operations comprising:
    receiving, at a serving distributed unit (DU) of a base station from a centralized unit control plane (CU-CP) of the base station, information indicating a handover priority ranking of a plurality of Layer 1/Layer 2 triggered mobility (LTM) target cells of a second DU of the base station, and
    selecting, at the serving DU and based on the received information, one of the plurality of LTM target cells for handover of service for a user equipment (UE) from the serving DU, and triggering the handover of the service for the UE from the serving DU to the selected target cell, wherein each of the plurality of LTM target cells from which the serving DU selects satisfies handover criteria, the handover being a Layer 1/Layer 2 handover triggered by a Layer 1/Layer 2 measurement with respect to the selected target cell of the second DU that is different from the serving DU,
wherein the handover priority ranking is based on respective similarities between a serving cell configuration of a serving cell and a target cell configuration of each of the plurality of LTM target cells.

2. The apparatus of claim 1, wherein the target cell configuration of each of the plurality of LTM target cells includes at least one of:
a configuration regarding guaranteed bit rate (GBR) allocation for GBR data radio bearers (DRBs),
a configuration regarding packet data unit (PDU) session to DRB mapping,
a configuration regarding a carrier configuration for carrier aggregation,
a configuration regarding slice mapping for UE services, and
a configuration regarding the UE's accepted DRBs.

3. The apparatus of claim 2, wherein at least one target DU including the plurality of LTM target cells provides the target cell configuration for each of the plurality of LTM target cells to the CU-CP in an F1 message.

4. The apparatus of claim 3, wherein the at least one target DU also provides a list of changes for the plurality of LTM target cells compared to a serving cell configuration.

5. The apparatus of claim 1, wherein the handover priority ranking is based on the configuration of each of the plurality of LTM target cells compared to a configuration of the serving cell.

6. The apparatus of claim 5, where the handover priority ranking is re-computed whenever an LTM target cell is added, reconfigured, or removed for the UE.

7. The apparatus of claim 1, wherein the handover criteria includes a predetermined threshold radio quality;
    the operations further comprise determining, at the serving DU, which one or more of the plurality of target cells has a radio quality above the predetermined threshold radio quality; and
    the selection is among only the one or more determined target cells.

8. The apparatus of claim 1, wherein the triggering includes transmitting, from the serving DU to the UE, a Medium Access Control (MAC) control element (CE) message.

9. The apparatus of claim 1, wherein the base station has a disaggregated architecture.

10. The apparatus of claim 1, wherein the base station includes a Next Generation Radio Access network (NG-RAN) node.

11. The apparatus of claim 10, wherein the NG-RAN node includes a gNodeB or an ng-eNodeB.

12. The apparatus of claim 1, wherein the base station includes the at least one processor and the at least one non-transitory storage media.

13. At least one non-transitory storage media storing instructions that, when executed by at least one processor, cause the at least one processor to perform operations comprising:
    receiving, at a serving distributed unit (DU) of a base station from a centralized unit control plane (CU-CP) of the base station, information indicating a handover priority ranking of a plurality of Layer 1/Layer 2 triggered mobility (LTM) target cells of a second DU of the base station; and
    selecting, at the serving DU and based on the received information, one of the plurality of LTM target cells for handover of service for the UE from the serving DU, and triggering the handover of the service for a user equipment (UE) from the serving DU to the selected target cell, wherein each of the plurality of LTM target cells from which the serving DU selects satisfies handover criteria, the handover being a Layer 1/Layer 2 handover triggered by a Layer 1/Layer 2 measurement with respect to the selected target cell of the second DU that is different from the serving DU,
wherein the handover priority ranking is based on respective similarities between a serving cell configuration of a serving cell and a target cell configuration of each of the plurality of LTM target cells.

14. The storage media of claim 13, wherein the target cell configuration of each of the plurality of LTM target cells includes at least one of:
a configuration regarding guaranteed bit rate (GBR) allocation for GBR data radio bearers (DRBs),
a configuration regarding packet data unit (PDU) session to DRB mapping,
a configuration regarding a carrier configuration for carrier aggregation,

25 a configuration regarding slice mapping for UE services, and a configuration regarding the UE's accepted DRBs.

15. A computer-implemented method, comprising:

receiving, at a serving distributed unit (DU) of a base station from a centralized unit control plane (CU-CP) of the base station, information indicating a handover priority ranking of a plurality of Layer 1/Layer 2 triggered mobility (LTM) target cells of a second DU of the base station; and selecting, at the serving DU and based on the received information, one of the plurality of LTM target cells for handover of service for a user equipment (UE) from the serving DU, and triggering the handover of the service for the UE from the serving DU to the selected target cell, wherein each of the plurality of LTM target cells from which the serving DU selects satisfies handover criteria, the handover being a Layer 1/Layer 2 handover triggered by a Layer 1/Layer 2 measurement with respect to the selected target cell of the second DU that is different from the serving DU, wherein the handover priority ranking is based on respective similarities between a serving cell configuration of a serving cell and a target cell configuration of each of the plurality of LTM target cells.

16. The method of claim 15, wherein the target cell configuration of each of the plurality of LTM target cells includes at least one of:

a configuration regarding guaranteed bit rate (GBR) allocation for GBR data radio bearers (DRBs), a configuration regarding packet data unit (PDU) session to DRB mapping, a configuration regarding a carrier configuration for carrier aggregation, a configuration regarding slice mapping for UE services, and a configuration regarding the UE's accepted DRBs.

* * * * *